Aug. 16, 1966     T. F. SARAH     3,266,747

PICK-UP PIN EXTENSION MECHANISM FOR SPINNING REELS

Filed April 2, 1964     4 Sheets-Sheet 1

INVENTOR.
THOMAS F. SARAH

BY Hamilton & Cook

ATTORNEYS

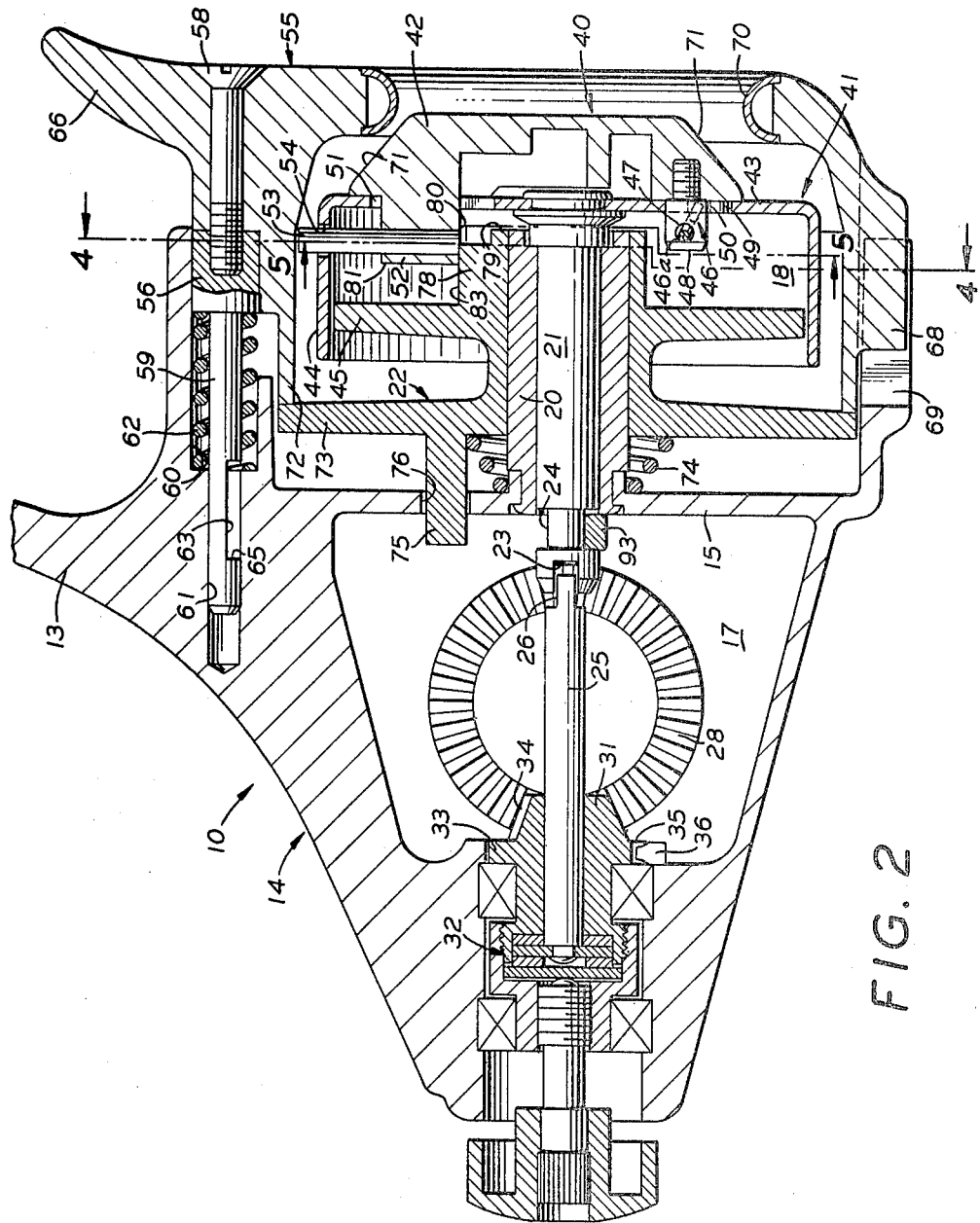

Aug. 16, 1966  T. F. SARAH  3,266,747
PICK-UP PIN EXTENSION MECHANISM FOR SPINNING REELS
Filed April 2, 1964  4 Sheets-Sheet 3

INVENTOR.
THOMAS F. SARAH
BY Hamilton & Cook
ATTORNEYS

INVENTOR.
THOMAS F. SARAH

United States Patent Office 3,266,747
Patented August 16, 1966

---

3,266,747
PICK-UP PIN EXTENSION MECHANISM FOR SPINNING REELS
Thomas F. Sarah, Akron, Ohio, assignor to Pflueger Corporation, Akron, Ohio, a corporation of Ohio
Filed Apr. 2, 1964, Ser. No. 356,770
5 Claims. (Cl. 242—84.2)

The present invention relates generally to fishing reels of the spinning type. More particularly, the present invention relates to fishing reels having a stationary spool and a radially enclosed flyer to wind the line onto the spool. Specifically, the invention relates to an undermounted spinning reel having a control operable by a finger on the casting hand to release the line for casting and snub the line at the proper time during the casting procedure to regulate the length of the cast.

The spinning reel with its stationary spool from which the line uncoils during casting has achieved widespread acceptance, particularly because it eliminates backlash which so frequently occurs with the type of reel in which the spool rotates to pay out the line during the cast.

Moreover, the spinning reel has garnered even more advocates because it is as readily usable on a casting rod, fly rod or specialized spinning rod.

Generally, all spinning reels may be classified according to three characteristics. They are open face or closed face, finger snubbed or mechanically snubbed, and undermounted or overmounted.

The open face or closed face characteristics refer to the exposure of the spool. The closed face reels are usually provided with a cover cap or the like, which encompasses the spool and permits exit of the line through an eyelet. Such a construction is advantageous in that the coils peeling off of the spool are confined within the cover cap so that the line reaches the first line guide on the fishing pole traveling in almost a straight line and therefore there is little or no opportunity for the line to tangle itself about the line guide. However, so confining the coils does add to the frictional resistance against the line as it pays out. In open face reel constructions there is no cover cap and the coils peeling off of the spool during the cast are not confined within the reel, thus reducing friction at the reel. However, the line is often still in a partial coil as it reaches the first line guide and the first line guide must be of increased diameter to reduce friction. With open face reels it is found necessary to provide at least the first line guide with sloping protectors extending from the pole to the outermost portion of the guide to prevent the line from coilingly encircling the guide and binding thereon.

Overmounted and undermounted refers to the position in which the reel is mounted with respect to the rod. When a fisherman is standing with his fishing rod in his casting hand and the tip of the rod is pointed forwardly away from him, if the reel is on the top of upper side of the rod he is using an overmounted reel. If the reel is underneath or on the lower side of the rod, he is using an undermounted reel.

The finger snubbed reel requires that the fisherman use one or more fingers to engage, or snub, the line both to control release and flight of the line. A mechanically snubbed reel utilizes a metal snubbing pin or a pinching of the line between two elements to prevent the line from paying off the spool until the desired time and snub the line at the desired time after the cast to control the flight.

As an example of applying such classifications to a typical reel, the reel disclosed in my U.S. Letters Patent No. 2,911,165, is a closed face, overmounted, mechanically snubbed spinning reel.

Many fishermen prefer the balance and ease with which the pole may be held during retrieving of the line when an undermounted reel is used. However, there are also those fishermen wheo prefer to control all of the operations of the reel, except winding, with the fingers on the casting hand, and when the reel is undermounted, two hands are generally required to prepare the reel for casting or else a complex lever arrangement must be employed.

In my copending U.S. application Serial No. 300,790 filed August 8, 1963, now Patent No. 322,009, I disclosed an undermounted reel in which the line can be snubbed and released by actuation of a finger control and in which the line is wound on to the spool by a rotatable carrier on which is mounted a selectively retractible and extendible pickup pin. In reels utilizing a pickup pin assembly a complicated latching and release mechanism has heretofore been required.

It is therefore an object of the present invention to provide a spinning reel having an improved and simplified mechanism whereby the line pickup pin is retained in retracted position and returned to extended pickup position as desired.

It is another object of the present invention to provide an improved spinning reel, as above, which may be undermounted and in which the line can be mechanically snubbed and released at the start of the cast and in which the flight or length of the cast can be controlled by mechanism operable by the fingers on the casting hand.

It is a further object of the present invention to provide a spinning reel, as above, which imparts a minimum frictional resistance to the line as it uncoils from the spool and yet sufficiently reduce the size of the coil leaving the reel so that there is little or no tendency for the line bindingly to engage the first line guide.

It is a still further object of the present invention to provide a spinning reel, as above, which is uncomplicated and economical to produce.

These and other objects of the invention, as well as the advantages thereof, over existing and prior art forms, will be apparent in view of the following detailed description in the attached drawings and are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

In the drawings:

FIG. 2 is an enlarged cross section taken substantially on line 2—2 of FIG. 1 showing the pickup pin extended;

Figure 1:
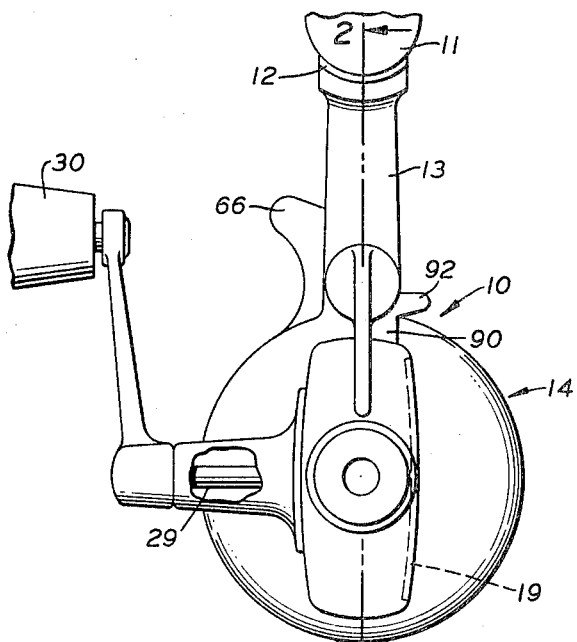
FIG. 1 is a rear elevation of an undermounted reel constructed in accordance with the concept of the present invention.
Figure 4:
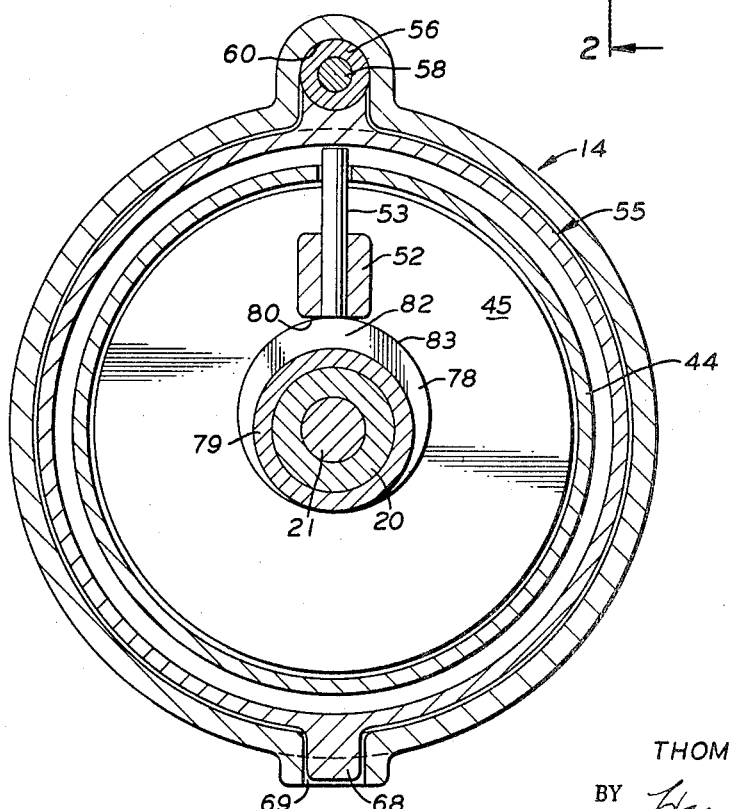
FIG. 4 is a cross section taken substantially on line 4—4 of FIG. 2.

In general, a spinning reel constructed according to the concept of the present invention is of the undermounted type and has a nonrotatable spool carried within the frame or housing. A rotatable flyer is mounted adjacent the outer, or line access, side of the spool. The flyer is comprised of a carrier and a pin holder radially slidable with respect to said carrier. The pin holder has a radially oriented pickup pin fixed thereto. A snubbing cap generally in the shape of a cover cap except with a much larger opening encircles the spool and flyer and is mounted on the housing so as to be slidable axially with respect to the spool by actuation of a finger operated slide plunger attached thereto. Actuation of the slide plunger snubs the line between the pin holder and the cap and, at the same time, radially shifts the pin holder to retract the pickup pin and axially shifts the cam, or throw, means, which radially extends the pickup pin upon rotation of the crank handle, out of engagement with the pin holder.

Referring more particularly to the drawings, the improved reel, indicated generally by the numeral 10, is detachably mounted on the under side of a rod 11, as by a mounting shoe 12, in a well-known manner. An offset bar 13 spaces the reel housing 14 sufficiently below the mounting shoe 12 so that the fisherman may grasp the rod with his fingers between the housing 14 and shoe 12, and even with two fingers straddling the offset bar 13.

The housing 14 is divided by an integral partition wall 15 into a gear compartment 17 and a spool compartment 18. A cover plate 19 on the side of the rear, preferably flattened, portion of the housing containing the gear compartment 17 provides access thereto.

Fixed to and extending forwardly of the partition wall 15, is a cylindrical sleeve bearing bushing 20. Interiorly of the bushing 20 is a flyer shaft 21 mounted for rotation. Exteriorly of the bushing 20 an axially slidable spool 22 is supported. The rear portion of the flyer shaft 21 extends through the partition wall 15 into the gear compartment 17 and terminates in a slot 23.

Forwardly of the slot 23 is an annular groove 24 which will be more fully hereinafter described in conjunction with the take-apart mechanism.

Axially aligned with the flyer shaft 21 is the drive shaft 25. A milled flat 26 on the forward end of the drive shaft 25 is insertably received within the slot 23 in the rear of the flyer shaft 21, thus forming the drive connection therebetween.

A drive gear 28 is nonrotatably secured to a crank shaft 29 rotatable by the usual crank handle 30.

The drive gear 28 meshes with a bevel pinion gear 31 secured, as by an adjustable friction brake means 32 of the type fully disclosed in my copending U.S. application, Serial No. 300,790, to the drive shaft 25. A radially extending annular shoulder 33 rearwardly of the bevel gear teeth 34 is provided with teeth 35 around the periphery thereof which are engaged by an antireverse pawl 36.

The flyer, indicated generally by the numeral 40, is comprised of a cup shaped carrier 41 and a pin holder, or slide, 42 and is nonrotatably mounted on the forward end of the flyer shaft 21 for rotation therewith. Specifically, the base 43 of the cup-like carrier 41 is swaged, or otherwise suitably attached to, flyer shaft 21. The skirt 44 of the carrier 41 extends rearwardly over the front flange 45 of the spool 22.

Figure 5:
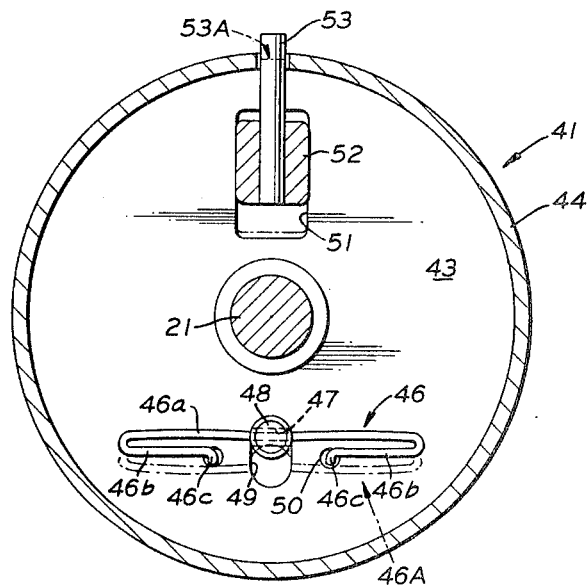
FIG. 5 is a cross section taken susbtantially on line 5—5 of FIG. 2.

The pin holder 42 is secured to the carrier 41 by the action of a restraining means 46. The restraining means 46 is an elongate, "C" shaped wire spring the body portion 46a of which passes through a bore 47 in the head of a cap screw, or other stud means, 48. The cap screw passes through a radially oriented guide slot 49 in the carrier base 43 and is secured to the holder 42 with the bore 47 on the opposite side of the base 43 from the holder 42. The ends of the hook portion 46b of the "C" shaped restraining means 46 are turned outwardly of the plane of C shaped restraining means 46 to form gripping lugs 46c. The lugs 46c are retrained in anchor holes 50 against the biasing action of the spring restraining means 46. It may be found necessary to channel the holder 42 beneath the holes 50 so that a sufficient portion of the lugs 46c can be inserted into the holes 50 without obstructively contacting the holder 42. The radial extent of the guide slot 49 limits the radially innermost and radially outermost position of the holder 42 with respect to the carrier 41. As best shown in FIG. 5, one anchor hole 50 is positioned on each side of the guide slot 49 at about the central portion of the radial extent of the slot 49.

Because the dimension between the bore 47 and the anchor holes 50 never exceeds the dimension that the lugs 46c tend to move apart from the body portion 46a, the biasing action of the restraining means 46 applies an axial component which is at all times sufficient to maintain the holder 42 on the carrier 41.

This same restraining means 46 also biasingly maintains the holder 42 in selective radial positions with respect to the carrier 41 because of the relative position of the anchor holes 50 with respect to the guide slot 49.

On the diametrically opposite side of flyer shaft 21 from the guide slot 49, a radially oriented access slot 51 is provided in the base 43 of the carrier 41. Slot 51 is aligned with guide slot 49 and receives therethrough a spur 52 which extends rearwardly of holder 42.

Pickup pin 53 is mounted in, and extends radially outwardly of, spur 52 through bore 54 in the skirt 44 of carrier 41. The pickup pin 53 normally extends radially outwardly of the carrier 41, as shown in FIG. 2, to wind the line onto the spool as it is retrieved.

Radially outwardly of the spool 22 and flyer 40 is an annular snubbing cap, indicated generally by the numeral 55. The cap 55 is connected to a plunger 56, as by a screw 58. The plunger 56 and its rearwardly extending guide rod 59 are slidably received in concentric bores 60 and 61, respectively. A helical compression spring 62 is positioned in the bore 60 and encircles the guide rod 59 biasingly to urge the plunger 56 in cap 55 axially outwardly, or forwardly. A slot 63 grooved axially in guide rod 59 receives a lock spur 64 (FIG. 3) and the engagement of the lock spur 64 with the limit shoulder 65 in slot 63 determines the axially outermost position of cap 55.

The cap also has a trigger 66 which extends generally upwardly therefrom in proximity to the location of the screw 58 and is engageable by the forefinger of the fisherman. On the opposite side of cap 55 from the trigger 66 is a radially extending fin 68 which is slidably received in an axially aligned slot 69 to stabilize the cap 55.

Figure 3:
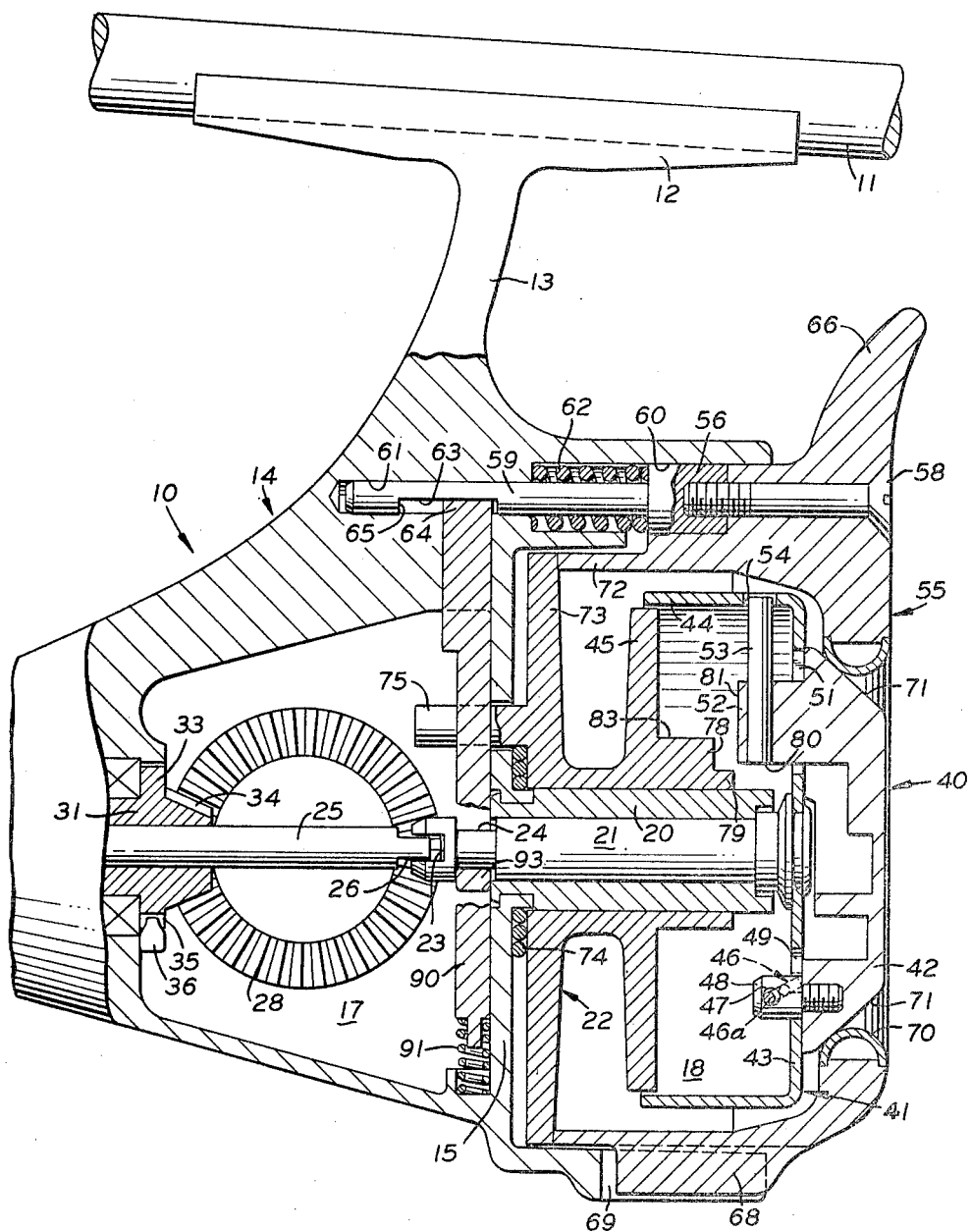
FIG. 3 is a fragmentary area of FIG. 2 showing the pickup pin retracted.

An annular collar 70, which may be attached to (as shown), or be an integral part of, the cap 55 is positioned concentrically of the flyer 40 and its component parts. When the cap 55 is moved rearwardly by finger pressure on trigger 66, the collar 70 engages a truncated conical cam surface 71 on the forward face of the pin holder 42. The action of the collar 70 against the cam surface 71 slides the pin holder 42 radially inwardly with respect to the carrier 41 until the cam surface 71 is centered with respect to the collar 70. As best shown in FIG. 3, when the cam surface 71 and the collar 70 are centered, the holder 42 is radially translated (from the position shown in FIG. 2) to withdraw the pickup pin 53 so that it no longer extends radially outwardly of the skirt 44 on the carrier 41. As the holder 42 is thus translated, the body portion 46a of the restraining means 46 is carried by bore 47 in cap screw 48 until it passes through the axial plane which cuts the centers of the holes 50. Thereafter, the radial component of the biasing force of spring 46 assists in moving the pickup pin 53 to retracted positoin and biasingly restrains it there until the crank handle 30 is cranked to retrieve the line. See positions 53A and 46A in FIG. 5.

At the same time that the collar 70 is thus translating the holder 42, a skirt 72 extending axially from at least a portion of the annular cap 55 engages the inner flange 73 of the spool 22 and slides it axially rearwardly along the bushing 20 against a compressive bias of a spiral spring 74. A suitable means is provided to permit the spool 22 to slide on bushing 20 and yet prevent it from rotating thereon. As shown, a stub shaft 75 may be provided to extend rearwardly from the inner flange 73 of spool 22 to be slidably received in the bore 76 through the partition wall 15.

On the forward, or outer, side of the spool 22, adjacent to the outer flange 45 an eccentric cam 78 extends radially of the spool hub 79. The afore-described axial displacement of the spool 22 translates the cam 78 out of radial alignment with the spur 52, the radially innermost surface 80 of which comprises the cam follower for cam 78, and thus permits the pin holder 42 to be sufficiently radially moved to retract the pin 53.

The fisherman would operate the reel as follows: To cast the lure the fisherman would apply finger pressure to trigger 66 to press in the plunger 56 and moving the cap 55 rearwardly to bring the collar 70 against the cam surface 71 on the pin holder 42, both to translate the holder 42 until the pickup pin 53 is retracted and pinchingly to engage the line therebetween. The trigger is thus maintained until the moment during the cast when the fisherman desires to release the line. By releasing his finger pressure against the trigger pinching of the line is removed, but the pickup pin 53 remains retracted by the biasing action of the restraining spring means 46.

If desired, the fisherman may stop the cast at any time during the flight of the lure by simply again applying pressure to trigger 66 so that the line is again pinchingly snubbed between the collar 70 and the pin holder 42.

When rewinding is started by turning the crank handle 30, the flyer shaft 21 rotates the carrier 41 and the pin holder 42. Coil spring 74, which urges the spool 22 forwardly, biases the cam 78 against the rearmost surface 81 of the spur 52 until the rotation of the carrier 41 relative to the spool 22 positions the spur 52 on the opposite side of the flyer shaft from the cam lobe 82 at which time the spool 22 can move to its forwardmost position with the cam 78 radially aligned with the follower surface 80 on spur 52.

As shown in FIG. 2 the forwardmost position of the spool 22 is controlled by engagement of the inner flange 73 with the skirt 72 on the cap 55, or by other suitable means not shown.

Continued rotation of the crank handle causes the follower 80 to traverse the radially directed work surface 83 of cam 78 until the lobe 82 lies directly beneath the follower 80. At this point the pin holder has been moved to its radially outermost position on base 43, and the pickup pin 53 is fully extended. Here again, as the holder 42 is translated it is moved initially against the biasing action of the restraining spring 46 until the body portion 46a passes through the axial plane cutting the centers of the holes 50. Thereafter, the spring assists the radial movement of the holder 42 and biasingly restrains the pickup pin 53 in extended position to catch the line and wind it onto the spool.

The reel take-apart mechanism, depicted in FIG. 3, includes a lock bar 90 which is mounted so as to be vertically—i.e., transversely the axis of the flyer shaft 21—slidable in housing 14. The lock bar 90 is located immediately rearwardly of the partition wall 15 in the forward portion of the gear compartment 17 and is upwardly biased by the action of a compression spring 91. Extending outwardly of the housing 14 is a lock bar actuating lip 92 (FIG. 1) which is located near the top of the housing rearwardly of the offset bar 13 where it is readily accessible for taking the reel apart.

Downward pressure against the actuating lip 92 retracts the lock spur 64 from the slot 63 in guide rod 59 to permit removal of the cap 55, plunger 56, spring 62 and collar 70.

This downward pressure also disengages a tooth 93 on lock bar 90 from the annular groove 24 in flyer shaft 21 and permits the flyer 40 and the shaft 21 attached thereto to be extracted forwardly out of the housing.

It should thus be apparent that the subject invention provides an undermounted, closed face, mechanically snubbed spinning reel which has an improved and simplified mechanism whereby the pickup pin is extended and retracted and that otherwise accomplishes the objects of the invention.

What is claimed is:

1. In a spinning reel having a housing, a nonrotatable line spool mounted in said housing, a flyer mounted adjacent said spool, said flyer comprising a carrier and a holder, said carrier fixed to, and rotatable with, a selectively rotatable shaft, said holder mounted on said carrier for radial movement with respect thereto, a restraining means operably connected between said carrier and said holder, a pickup pin attached to said holder extendible radially outwardly of said carrier and retractible with respect thereto, a cam follower on said holder, a cam means supported in said housing and axially movable into and out of radial alignment with said cam follower, biasing means urging said cam means toward radial alignment with said cam follower, a cap positioned radially of said flyer, supporting means mounting said cap on said housing for selective axial movement with respect to said flyer, said cap having a guide opening for permitting the passage of line therethrough outwardly and off the end of the spool, means on said cap to engage said holder upon axially rearward movement of said cap for engaging said holder to snub the fish line therebetween and move said holder radially inwardly with respect to said carrier and retract said pickup pin, means simultaneously to move said cam means out of radial alignment with said cam follower, rotation of said flyer engaging said cam means against said cam follower to move said holder radially outwardly with respect to said carrier to extend said pickup pin.

2. In a spinning reel having a housing, a nonrotatable line spool mounted in said housing, a flyer mounted adjacent said spool, said flyer comprising a carrier and a holder, said carrier fixed to, and rotatable with, a selectively rotatable shaft, said holder mounted on said carrier for radial movement with respect thereto, a restraining means operably connected between said carrier and said holder, a pickup pin attached to said holder extendible radially outwardly of said carrier and retractible with respect thereto, a cam follower on said holder, a cam means supported in said housing and axially movable into and out of radial alignment with said cam follower, biasing means urging said cam means into radial alignment with said follower, a cap positioned radially of said flyer, supporting means mounting said cap on said housing for selective axial movement with respect to said flyer, said cap having a guide opening for permitting the passage of line therethrough outwardly and off the end of the spool, means on said cap to engage said holder upon axially rearward movement of said cap for engaging said holder to snub the fish line therebetween and move said holder radially inwardly with respect to said carrier and retract said pickup pin, means also on said cap simultaneously to move said cam means out of radial alignment with said cam follower, rotation of said flyer engaging said cam means against said cam follower to move said holder radially outwardly with respect to said carrier to extend said pickup pin.

3. An undermounted spinning reel comprising, a housing, a shaft mounted in said housing for selective rotation, a nonrotatable line spool mounted concentrically of said shaft, a carrier mounted adjacent said spool on said shaft for rotation therewith, a cam on the carrier side of said spool, a holder mounted on said carrier for radial movement with respect thereto, a cam follower on said holder, said spool and said holder being relatively axially movable toward and away from each other to move said cam and said cam follower into and out of radial alignment, restraining spring means between said holder and said carrier, a pickup pin attached to said holder extendible radially outwardly of said carrier and retractible with respect thereto, biasing means urging said cam means toward radial alignment with said cam follower, a cap positioned radially of said carrier, supporting means mounting said cap on said housing for selective axial movement with respect to said carrier, said cap having a guide opening for permitting the passage of the line therethrough outwardly and off the end of said spool, means on said cap to engage said holder upon axially rearward movement of said cap for engaging said holder to snub the line therebetween and move said holder radially inwardly with respect to said carrier and retract said pickup pin, means also on said cap to axially separate said spool and holder so that said cam and cam follower are not radially aligned, rotation of said shaft and carrier attached thereto permitting said cam and said follower to move into radial alignment and by engagement with said cam and said follower, moving said holder radially outwardly with respect to said carrier for extension of said pickup pin.

4. An undermounted spinning reel, as set forth in claim 3, in which the means axially to separate said spool and holder comprises a skirt on said cap which engages said spool, and in which a spring means constantly biases said spool toward said holder.

5. In a spinning reel having a housing, a nonrotatable line spool mounted in said housing, a flyer mounted adjacent said spool, said flyer comprising a carrier and a holder, said carrier fixed to, and rotatable with, a selectively rotatable shaft, said holder mounted on said carrier for radial movement with respect thereto, a radially oriented elongate guide slot in said carrier, an axially oriented stud means on said holder extending through said slot, a "C" shaped spring means having a body portion and a hook portion on each end of said body portion, gripping lugs on said hook portions, an anchor hole on each side of said guide slot at about the central portion of the radial extent of said guide slot, said gripping lugs received in said anchor holes, a pickup pin attached to said holder extendible radially outwardly of said carrier and retractible with respect thereto, said "C" shaped spring means maintaining said holder on said carrier and restraining said pickup pin selectively in extended and retracted position, a cam follower on said holder, a cam means supported in said housing and axially movable into and out of radial alignment with said cam follower, biasing means urging said cam means toward radial alignment with said cam follower, means for selectively moving said holder radially inwardly with respect to said carrier to retract said pickup pin and move said cam means axially out of radial alignment with said cam follower, rotation of said flyer engaging said cam means against said cam follower to move said holder radially outwardly with respect to said carrier to extend said pickup pin.

References Cited by the Examiner
UNITED STATES PATENTS

| | | | |
|---|---|---|---|
| 2,863,616 | 12/1958 | Hutchison et al. | 242—84.2 |
| 2,911,165 | 11/1959 | Sarah | 242—84.2 |
| 3,000,586 | 10/1961 | Mandolf | 242—84.2 |
| 3,059,873 | 10/1962 | Hull | 242—84.2 |
| 3,093,340 | 6/1963 | Mauborgne | 242—84.21 |
| 3,108,762 | 10/1963 | Murvall | 242—84.2 |

FOREIGN PATENTS 905,268    4/1965    France.

STANLEY N. GILREATH, *Primary Examiner.*

MERVIN STEIN, *Examiner.*

B. S. TAYLOR, *Assistant Examiner.*

UNITED STATES PATENT OFFICE
CERTIFICATE OF CORRECTION

Patent No. 3,266,747                                August 16, 1966

Thomas F. Sarah

It is hereby certified that error appears in the above numbered patent requiring correction and that the said Letters Patent should read as corrected below.

Column 1, line 32, for "cover cap" read -- cover cap, --; line 56, for "of upper side" read -- or upper side --; column 2, line 4, for "wheo" read -- who --; line 11, for "322,009" read -- 3,222,009 --; column 3, line 63, for "portion 46b" read -- portions 46b --; column 8, line 29, for "4/1965" read -- 4/1945 --.

Signed and sealed this 26th day of September 1967.

(SEAL)
Attest:

ERNEST W. SWIDER                                 EDWARD J. BRENNER
Attesting Officer                                           Commissioner of Patents